(12) United States Patent
Ezaki et al.

(10) Patent No.: US 8,394,185 B2
(45) Date of Patent: Mar. 12, 2013

(54) NON-AQUEOUS INKJET INK

(75) Inventors: Naofumi Ezaki, Ibaraki-ken (JP); Hiroshi Hayashi, Ibaraki-ken (JP)

(73) Assignee: Riso Kagaku Corporation, Tokyo (JP)

( * ) Notice: Subject to any disclaimer, the term of this patent is extended or adjusted under 35 U.S.C. 154(b) by 0 days.

(21) Appl. No.: 12/654,832

(22) Filed: Jan. 6, 2010

(65) Prior Publication Data

US 2010/0180795 A1   Jul. 22, 2010

(30) Foreign Application Priority Data

Jan. 22, 2009  (JP) ................. P2009-011631

(51) Int. Cl.
*C09D 11/02* (2006.01)
(52) U.S. Cl. ................. 106/31.25; 106/31.26
(58) Field of Classification Search ........... 106/31.25, 106/31.26
See application file for complete search history.

(56) References Cited

U.S. PATENT DOCUMENTS

| 6,086,661 A * | 7/2000 | Malhotra et al. ........... 106/31.43 |
| 2005/0039634 A1 * | 2/2005 | Hermansky ............... 106/31.59 |
| 2008/0196622 A1 * | 8/2008 | Zhu ........................ 106/31.26 |
| 2008/0264288 A1 * | 10/2008 | Norsten et al. ............ 101/487 |

FOREIGN PATENT DOCUMENTS

| JP | 04-170475 A | 6/1992 |
| JP | 04-183762 A | 6/1992 |
| JP | 05-009421 A | 1/1993 |
| JP | 2002-212466 A | 7/2002 |

* cited by examiner

*Primary Examiner* — Kaj K Olsen
*Assistant Examiner* — Veronica F Faison
(74) *Attorney, Agent, or Firm* — Nath, Goldberg & Meyer; Jerald L. Meyer; Megan B. Doughty

(57) ABSTRACT

A non-aqueous inkjet ink comprising a coloring material and a water-insoluble solvent, wherein the coloring material is water-soluble or water-dispersible, and the amount of water within the ink is less than the amount of water required to dissolve or disperse the coloring material.

5 Claims, No Drawings

NON-AQUEOUS INKJET INK

CROSS REFERENCE TO RELATED APPLICATIONS

This Application is based upon and claims the benefit of priority from prior Japanese Patent Application No. 2009-011631 filed on Jan. 22, 2009; the entire contents of which are incorporated by reference herein.

BACKGROUND OF THE INVENTION

1. Field of the Invention

The present invention relates to a non-aqueous inkjet ink.

2. Description of the Related Art

An inkjet recording system is a system in which an inkjet ink with a high degree of fluidity is sprayed from very fine head nozzles in the form of ink particles, and these ink particles then record an image on a printing target positioned opposing the nozzles. This type of system enables high-speed printing to be conducted with minimal noise, and is therefore rapidly becoming widespread.

In terms of the solvent, inks can be broadly classified into aqueous inks and non-aqueous inks. Non-aqueous inks that do not use water as the ink solvent medium, including solvent-based inks that use a volatile solvent as the main constituent and oil-based inks that use a non-volatile solvent as the main constituent, exhibit superior drying properties to aqueous inks, and also exhibit excellent printability.

The coloring material for a non-aqueous ink may use either a dye or a pigment, although using a dye offers the advantage of particularly favorable color production.

In a non-aqueous ink, an oil-soluble dye is used, and when printing is performed onto plain paper, the oil-soluble dye tends to be readily drawn into the interior of the recording paper together with the non-aqueous solvent medium. As a result, the image density tends to fall, and show-through (a phenomenon in which the ink penetrates through to the underside of the printed item) becomes prevalent.

Another example of a non-aqueous ink that uses a dye is a water-in-oil (W/O) emulsion ink in which an aqueous solution containing a dissolved water-soluble dye is emulsified within a non-aqueous solvent. Patent Document 1 (Japanese Patent Laid-Open No. H04-170475) and Patent Document 2 (Japanese Patent Laid-Open No. H04-183762) disclose, as inkjet inks, water-in-oil emulsion inks comprising an oil phase component, a water phase component containing water and an aqueous dye as the main constituents, and an emulsifier. Patent Document 3 (Japanese Patent Laid-Open No. H05-9421) discloses an inkjet ink comprising a core material, which is composed of a colorant dissolved or dispersed within a first solvent medium, emulsified within a second solvent medium that does not dissolve the core material.

W/O emulsion inks exhibit minimal show-through when printed onto plain paper, but if a dye having low solubility in water is used, then achieving a combination of favorable image density and good ink storage stability has proven difficult.

Conventional W/O emulsion inks require an amount of water that is sufficient to completely dissolve the dye within the ink, meaning increasing the dye concentration within the ink requires a concomitant increase in the amount of water. However, as the amount of water within the ink is increased, the emulsion stability may deteriorate, or a W/O emulsion may not be able to be formed at all. In other words, in conventional W/O emulsion inks, the dye content is limited by the amount of water, and if the amount of water is reduced to enable favorable retention of the storage stability of the ink, then the amount of dye is also reduced, making it impossible to improve the image density.

Patent Document 4 (Japanese Patent Laid-Open No. 2002-212466) discloses an oil-based ink for an inkjet that is formed from a mixed liquid comprising an aqueous dye solution and a reverse micelle solution prepared by dissolving a surfactant in a non-polar organic solvent. However, in a similar manner to W/O emulsion inks, an amount of water that is sufficient to completely dissolve the dye within the ink is required, and therefore improving the image density while ensuring favorable retention of the storage stability is very difficult.

Furthermore, even in non-aqueous inkjet inks that employ self-dispersible pigments, in a similar manner to that described above for inks that employ dyes, an amount of water that is sufficient to completely disperse the self-dispersible pigment within the ink is required, meaning improving the image density while ensuring favorable retention of the storage stability is problematic.

As described above, in those cases where a water-soluble or water-dispersible coloring material is used within a non-aqueous inkjet ink, problems remain in terms of the storage stability and the image density.

SUMMARY OF THE INVENTION

The present invention has an object of providing a non-aqueous inkjet ink that exhibits excellent ink storage stability and is capable of improving the image density.

One aspect of the present invention provides a non-aqueous inkjet ink comprising a coloring material and a water-insoluble solvent, wherein the coloring material is water-soluble or water-dispersible, and the amount of water within the ink is less than the amount of water required to dissolve or disperse the coloring material.

DETAILED DESCRIPTION OF THE EMBODIMENTS

A description of embodiments according to the present invention is presented below, but the examples within these embodiments in no way limit the scope of the present invention.

A non-aqueous inkjet ink of the present invention (hereafter also referred to as simply "the ink") is a non-aqueous inkjet ink comprising a coloring material and a water-insoluble solvent, wherein the coloring material is water-soluble or water-dispersible, and the amount of water within the ink is less than the amount of water required to dissolve or disperse the coloring material. This ink exhibits excellent ink storage stability, and is capable of improving the image density. In this description, the term "non-aqueous ink" describes an ink in which an organic solvent is used as the main ink solvent medium.

According to the present invention, it is possible to provide a non-aqueous inkjet ink that exhibits excellent ink storage stability and is capable of improving the image density.

More specifically, in the present invention, because the amount of water within the ink is less than the amount of water required to dissolve or disperse the coloring material, an ink can be obtained in which the coloring material content is high relative to the amount of water within the ink. By restricting the amount of water within the ink while increasing the amount of the coloring material, higher density images can be obtained while the storage stability is favorably maintained. In other words, because the amount of water within the ink is small, the emulsification or solubilization of the water within the ink can be stably maintained, enabling the storage stability to be favorably maintained. Furthermore, because the amount of the coloring material is large relative to the amount of water within the ink, the image density can be improved while the storage stability is favorably maintained.

Furthermore, according to the present invention, regardless of the variety of coloring material used as the water-soluble or water-dispersible coloring material, a high concentration of the coloring material can be included with a small amount of water. For example, the present invention is effective regardless of whether the coloring material is water-soluble or water-dispersible, even for dyes or pigments that display low solubility or low dispersibility.

Generally, many of the dyes having any of the various enhanced fastness properties exhibit poor solubility in water and are unable to provide satisfactory color strength unless the dye concentration is increased considerably, but the present invention is also effective for these types of dyes.

There are no particular restrictions on the water-insoluble solvent of the present invention, and for example, hydrocarbon solvents, ester solvents, alcohol solvents or higher fatty acid solvents or the like may be used. These solvents may be used individually or in mixtures containing two or more different solvents. When two or more different solvents are mixed, the mixed liquid must form a single continuous phase.

Examples of the hydrocarbon solvents include aliphatic hydrocarbon solvents, alicyclic hydrocarbon solvents and aromatic hydrocarbon solvents. Specific examples of the aliphatic hydrocarbon solvents and alicyclic hydrocarbon solvents include Teclean N-16, Teclean N-20, Teclean N-22, No. 0 Solvent L, No. 0 Solvent M, No. 0 Solvent H, AF-4, AF-5, AF-6 and AF-7, all of which are names of products manufactured by Nippon Oil Corporation; Nisseki Isosol and Naphtesol, which are both names of products manufactured by Nippon Petrochemicals Co., Ltd.; and Isopar G, Isopar H, Isopar L, Isopar M, Exxsol D40, Exxsol D80, Exxsol D100, Exxsol D130 and Exxsol D140, all of which are names of products manufactured by Exxon Mobil Corporation.

Examples of the ester solvents include methyl laurate, isopropyl laurate, isopropyl myristate, isopropyl palmitate, isostearyl palmitate, isooctyl palmitate, methyl oleate, ethyl oleate, isopropyl oleate, butyl oleate, methyl linoleate, isobutyl linoleate, ethyl linoleate, isopropyl isostearate, methyl soybean oil, isobutyl soybean oil, methyl tallate, isobutyl tallate, diisopropyl adipate, diisopropyl sebacate, diethyl sebacate, propylene glycol monocaprate, trimethylolpropane tri-2-ethylhexanoate and glyceryl tri-2-ethylhexanoate.

Examples of the alcohol solvents include isomyristyl alcohol, isopalmityl alcohol, isostearyl alcohol and oleyl alcohol.

Examples of the higher fatty acid solvents include isononanoic acid, isomyristic acid, isopalmitic acid, oleic acid and isostearic acid.

The amount of the water-insoluble solvent may be set appropriately in accordance with the amount of water within the ink described below, but is typically within a range from 40 to 95% by mass, and preferably from 50 to 90% by mass, relative to the total mass of the ink.

There are no particular restrictions on the coloring material used in the present invention, provided it is either water-soluble or water-dispersible, but a coloring material comprising at least one water-soluble dye or self-dispersible pigment is preferred.

There are no particular restrictions on the water-soluble dyes that may be used, and water-soluble dyes or dyes that have been converted to a water-soluble state by reduction or the like may be selected from amongst basic dyes, acidic dyes, direct dyes, soluble vat dyes, acid mordant dyes, mordant dyes, reactive dyes, vat dyes and sulfide dyes and the like. Specific examples of water-soluble dyes include azo dyes, rhodamine dyes, methine dyes, azomethine dyes, xanthene dyes, quinone dyes, phthalocyanine dyes, triphenylmethane dyes, diphenylmethane dyes and methylene blue and the like. Any one of these dyes may be used alone, or two or more dyes may be used in combination.

According to the present invention, even a water-soluble dye that exhibits low solubility within water can be incorporated within the ink using a small amount of water. Accordingly, even if the degree of solubility of the water-soluble dye within water at 25° C. is 20% or lower, or even 10% or lower, the water-soluble dye can still be stably incorporated within the ink at a high concentration using only a small amount of water.

The amount of the water-soluble dye (solid fraction), relative to the total mass of the ink, is preferably within a range from 0.1 to 20% by mass, more preferably from 1 to 10% by mass, and still more preferably from 4.5 to 10% by mass. According to the present invention, because the amount of water within the ink can be reduced to a level that is less than the amount of water required to dissolve the dye, the dye content can be increased while the storage stability is maintained, meaning the image density can be improved. For example, even if the amount of water within the ink is 30% by mass or less, the amount of the water-soluble dye can be set preferably to 4% by mass or greater, more preferably 4.5% by mass or greater, and still more preferably 5.0% by mass or greater.

There are no particular restrictions on the self-dispersible pigments, and self-dispersible pigments produced by using a chemical or physical treatment to introduce a hydrophilic functional group at the surface of the pigment may be used.

Examples of the pigments into which the hydrophilic functional group may be introduced include organic pigments such as azo-based pigments, phthalocyanine-based pigments, dye-based pigments, condensed polycyclic pigments, nitro-based pigments and nitroso-based pigments (such as brilliant carmine 6B, lake red C, Watchung red, disazo yellow, Hansa yellow, phthalocyanine blue, phthalocyanine green, alkali blue, and aniline black); inorganic pigments, including metals such as cobalt, iron, chrome, copper, zinc, lead, titanium, vanadium, manganese and nickel, as well as metal oxides and sulfides, and yellow ocher, ultramarine and iron blue pigments; and carbon blacks such as furnace carbon black, lamp black, acetylene black and channel black. Any one of these pigments may be used alone, or two or more different pigments may be used in combination.

Further, in terms of the hydrophilic functional group introduced into the self-dispersible pigments, a functional group having ionicity is preferred. By charging the pigment surface with either anionicity or cationicity, the pigment particles can be dispersed stably within water by electrostatic repulsion. A sulfonic acid group, carboxyl group, carbonyl group, hydroxyl group or phosphonic acid group or the like is preferred as the anionic functional group. A quaternary ammonium group or quaternary phosphonium group or the like is preferred as the cationic group.

These hydrophilic functional groups may be either bonded directly to the pigment surface, or bonded via another atom grouping. Examples of this other atom grouping include an alkylene group, phenylene group or naphthylene group or the like, although this is not an exhaustive list. Examples of the method used for treating the pigment surface include a diazotization treatment, sulfonation treatment, hypochlorous acid treatment, humic acid treatment or vacuum plasma treatment or the like.

According to the present invention, even a self-dispersible pigment having a low threshold concentration for dispersion within water can be incorporated within the ink using a small amount of water. As a result, even if the dispersion threshold concentration for the self-dispersible pigment within water at 25° C. is 25% by mass or lower, or even 15% by mass or lower, the self-dispersible pigment can be incorporated stably within the ink at a high concentration using only a small amount of water.

The amount of the self-dispersible pigment (solid fraction), relative to the total mass of the ink, is preferably within a range from 0.1 to 25% by mass, more preferably from 1 to 20% by mass, and still more preferably from 5 to 15% by mass. According to the present invention, because the amount of water within the ink can be reduced to a level that is less than the amount of water required to disperse the self-dispersible pigment, the amount of the self-dispersible pigment can be increased while the storage stability is maintained, meaning the image density can be improved. For example, even if the amount of water within the ink is 30% by mass or less, the amount of the self-dispersible pigment can be set preferably to 4% by mass or greater, more preferably 4.5% by mass or greater, and still more preferably 5.0% by mass or greater.

The water-soluble dyes and self-dispersible pigments described above may be used alone, or a combination of two or more coloring materials maybe used.

The ink of the present invention may or may not include water, and if the ink does include water, then the amount of water within the ink is less than the amount required to dissolve or disperse the coloring material. Here, the amount of water required to dissolve or disperse the coloring material refers, in the case of a water-soluble coloring material, to the amount of water in a saturated aqueous solution of the coloring material, which is calculated from the degree of solubility when dissolving the coloring material in water, or in the case of a water-dispersible coloring material, to the amount of water in a dispersion threshold solution or threshold dispersion, which is calculated from the dispersion threshold concentration when dispersing the coloring material in water.

Furthermore, the amount of water within the ink can be measured using the Karl Fischer method. In the present invention, the amount of water within the ink may be any amount, provided it is less than the amount of water required to dissolve or disperse the coloring material, and the ink may contain no water at all.

Although there are no particular restrictions on the water, the use of a pure water such as ion-exchanged water or distilled water, or an ultra pure water is preferred.

According to the present invention, because the amount of water within the ink can be reduced relative to the degree of solubility of a water-soluble coloring material, or relative to the dispersibility of a water-dispersible coloring material, the amount of the water-soluble or water-dispersible coloring material can be increased relative to the amount of water within the ink. As a result, a higher density image can be obtained, while maintaining favorable storage stability.

In a preferred configuration, the amount of water within the ink, relative to the amount of water required to dissolve or disperse the coloring material, is preferably 60% by mass or less, and more preferably 30% by mass or less. Moreover, from the viewpoint of achieving favorable storage stability for the ink, this amount is preferably not more than 10% by mass, and more preferably 2% by mass or less.

There are no particular restrictions on the amount of water used, provided it satisfies the above range, although typically the amount of water within the ink, relative to the total mass of the ink, is preferably not more than 30% by mass, more preferably not more than 20% by mass, and still more preferably 15% by mass or less. By ensuring that the amount of water within the ink satisfies this range, the emulsified or solubilized state of the water within the ink can be maintained in a stable manner. In terms of favorably maintaining the storage stability of the ink, the amount of water within the ink is preferably minimal.

The ink of the present invention may include a surfactant to promote the emulsification or solubilization of the water within the water-insoluble solvent. There are no particular restrictions on the surfactant, and examples include anionic surfactants such as metal soaps, sulfate ester salts of higher alcohols and sulfate ester salts of polyoxyethylene adducts; cationic surfactants such as primary to tertiary amine salts and quaternary ammonium salts; ester-based nonionic surfactants formed from a polyhydric alcohol and a fatty acid, and nonionic surfactants such as fatty acid polyoxyethylene ethers, higher alcohol polyoxyethylene ethers, alkyl phenol polyoxyethylene ethers, sorbitan fatty acid esters, polyoxyethylene ethers of polyglycerol fatty acid esters, castor oil polyoxyethylene ethers, polyoxypropylene polyoxyethylene ethers and fatty acid alkylolamides. These surfactants may be used either alone or in combinations containing two or more different surfactants.

The amount of the surfactant may be determined with due consideration of factors such as the molar concentration of each of the surfactants, the surface area of the interface between the water-insoluble solvent and the water and water-soluble dye, and in some cases the surface area of the interface between the water-insoluble solvent and solids such as the self-dispersible pigment. The amount of the surfactant is preferably within a range from 0.1 to 10% by mass, and more preferably from 0.5 to 5.5% by mass, relative to the total mass of the ink.

The ink of the present invention may also include, as required, any of the various additives typically used within the technical field, provided the inclusion of these additives does not impair the object of the present invention.

Specific examples of these additives include anionic surfactants, cationic surfactants, amphoteric surfactants, nonionic surfactants, or polymer-based, silicone-based or fluorine-based surfactants, which may be added to the ink as antifoaming agents or surface tension reducing agents or the like. These surfactants are preferably added in amounts that do not impair the function of the aforementioned surfactant that is added to assist the solubilization or emulsification of the water within the water-insoluble solvent.

An electrolyte may be added to the ink to regulate the ink viscosity. Examples of the electrolyte include sodium sulfate, potassium hydrogen phosphate, sodium citrate, potassium tartrate and sodium borate, as well as combinations of two or more of these electrolytes. Further, sulfuric acid, nitric acid, acetic acid, sodium hydroxide, potassium hydroxide, ammonium hydroxide and triethanolamine and the like may also be used as ink thickening assistants. These compounds may also be used as pH regulators for regulating the pH of the ink.

By adding an antioxidant, oxidation of the ink components can be prevented, enabling the storage stability of the ink to be further improved. Examples of the antioxidant include L-ascorbic acid, sodium L-ascorbate, sodium isoascorbate, potassium sulfite, sodium sulfite, sodium thiosulfate, sodium dithionite and sodium pyrosulfite. Two or more of these antioxidants may also be used in combination.

By adding a preservative, decomposition of the ink can be prevented, enabling the storage stability of the ink to be further improved. Examples of the preservative include isothiazolone-based preservatives such as 5-chloro-2-methyl-4-isothiazolin-3-one, 2-methyl-4-isothiazolin-3-one, 2-n-octyl-4-isothiazolin-3-one and 1,2-benzisothiazolin-3-one; triazine-based preservatives such as hexahydro-1,3,5-tris(2-hydroxyethyl)-s-triazine; pyridine-based and quinoline-based preservatives such as sodium 2-pyridinethiol 1-oxide and 8-oxyquinoline; dithiocarbamate-based preservatives such as sodium dimethyldithiocarbamate; organobromine-based preservatives such as 2,2-dibromo-3-nitrilopropionamide, 2-bromo-2-nitro-1,3-propanediol, 2,2-dibromo-2-nitroethanol and 1,2-dibromo-2,4-dicyanobutane; as well as methyl p-hydroxybenzoate, ethyl p-hydroxybenzoate, potassium sorbate, sodium dehydroacetate and salicylic acid. Two or more of these preservatives may also be used in combination.

The ideal range for the viscosity of the ink of the present invention varies depending on factors such as the diameter of the discharge head nozzles and the discharge environment, but at 23° C. is typically within a range from 5 to 60 mPa·s, preferably from 5 to 30 mPa·s, and more preferably from 5 to 20 mPa·s. A viscosity within this range is suited to use within an inkjet recording device. Here, the viscosity is measured at 23° C. by raising the shear stress from 0 Pa at a rate of 0.1 Pa/s, and refers to the measured value at 10 Pa.

There are no particular restrictions on the method used for producing the ink of the present invention, and a sample method involves dissolving or dispersing the water-soluble or water-dispersible coloring material in water, adding the resulting solution or dispersion dropwise to the water-insoluble solvent under ultrasonic irradiation to prepare a W/O emulsion, and then using an evaporator or the like to remove water from the W/O emulsion. In this manner, by dissolving or dispersing the water-soluble or water-dispersible coloring material in water, subsequently preparing the ink by adding any other components, and then removing water from the ink, an ink can be provided in which the amount of water within the ink has been suppressed to a low level relative to the amount of the coloring material.

Further, a printed item printing using the above non-aqueous inkjet ink can be produced with a high image density and favorable image quality. The inkjet printer used for performing the printing may employ any of various printing systems, including a thermal system, a piezo system or an electrostatic system or the like. The printer discharges the non-aqueous inkjet ink of the present invention from the inkjet nozzles based on a digital signal, and adheres the discharged ink droplets to a recording medium such as a sheet of paper.

EXAMPLES

A more detailed description of the present invention is provided below based on a series of examples, although the present invention is in no way limited by these examples.

Examples and Comparative Examples

The inks of examples 1 to 7 were obtained using the components listed in Table 1, by preparing a W/O emulsion by adding an aqueous solution formed from the coloring material and the water to a mixture of the water-insoluble solvent and the surfactant, with the addition performed in a dropwise manner under ultrasonic irradiation, and subsequently dewatering the obtained W/O emulsion using an evaporator to regulate the amount of water within the ink. The dewatering of the W/O emulsion was performed at 50° C. and 100 hPa.

The inks of comparative examples 1 to 3 were obtained by preparing a W/O emulsion in the same manner as examples 1 to 7, but the subsequent dewatering of the W/O emulsion was not performed. In comparative example 1, a W/O emulsion was not formed. The ink of comparative example 4 was prepared by dissolving an oil-soluble dye in a water-insoluble solvent.

The components used are listed below.

Water Red 27: an acidic dye (rhodamine-based), manufactured by Orient Chemical Industries Co., Ltd.

Water Yellow 6: an acidic dye (diazo-based), manufactured by Orient Chemical Industries Co., Ltd.

Water Blue 3: a direct dye (phthalocyanine-based), manufactured by Orient Chemical Industries Co., Ltd.

CAB-O-JET 300: a self-dispersible carbon, manufactured by Cabot Corporation

Oil Yellow 129: an oil-soluble dye, manufactured by Orient Chemical Industries Co., Ltd.

AF-7: a naphthene-based non-polar solvent, manufactured by Nippon Oil Corporation IOP: isooctyl palmitate, manufactured by Nikko Chemicals Co., Ltd.

Hexaglyn PR-15: hexaglycerol polyricinoleate, manufactured by Nikko Chemicals Co., Ltd.

TABLE 1

| | | Ink compositions | | | | | |
|---|---|---|---|---|---|---|---|
| Parts by mass | | Example 1 | Example 2 | Example 3 | Example 4 | Example 5 | Example 6 |
| Coloring material (solid fraction) | Water Red 27 | 5.0 | — | — | — | 5.0 | 5.0 |
| | Water Yellow 6 | — | 10.0 | — | — | — | — |
| | Water Blue 3 | — | — | 20.0 | — | — | — |
| | CAB-O-JET 300 | — | — | — | 10.0 | — | — |
| | Oil Yellow 129 | — | — | — | — | — | — |
| Water | Ion-exchanged water | 50.0 | 40.0 | 50.0 | 56.7 | 50.0 | 50.0 |
| Water-insoluble solvent | AF-7 | 40.0 | 37.5 | 25.0 | 35.0 | 44.5 | 30.0 |
| | IOP | 40.0 | 37.5 | 25.0 | 35.0 | 44.5 | 30.0 |
| Surfactant | Hexaglyn PR-15 | 5.0 | 5.0 | 10.0 | 10.0 | 5.0 | 5.0 |
| Total | | 140.0 | 130.0 | 130.0 | 146.7 | 149.0 | 120.0 |

| Parts by mass | | Example 7 | Comparative example 1 | Comparative example 2 | Comparative example 3 | Comparative example 4 |
|---|---|---|---|---|---|---|
| Coloring material (solid | Water Red 27 | 5.0 | 5.0 | 4.0 | 1.0 | — |
| | Water Yellow 6 | — | — | — | — | — |
| | Water Blue 3 | — | — | — | — | — |

TABLE 1-continued

| | | Ink compositions | | | | |
|---|---|---|---|---|---|---|
| fraction) | CAB-O-JET 300 | — | — | — | — | — |
| | Oil Yellow 129 | — | — | — | — | 4.0 |
| Water | Ion-exchanged water | 50.0 | 49.3 | 40.0 | 10.0 | — |
| Water-insoluble solvent | AF-7 | 44.5 | 20.3 | 25.5 | 42.0 | — |
| | IOP | 44.5 | 20.3 | 25.5 | 42.0 | 96.0 |
| Surfactant | Hexaglyn PR-15 | 5.0 | 5.0 | 5.0 | 5.0 | — |
| Total | | 149.0 | 100.0 | 100.0 | 100.0 | 100.0 |

Degree of Solubility of Water-Soluble Dye

An excess amount of each water-soluble dye was added to 10 g of water, and following stirring for 3 hours at 25° C., the mixture was left to stand overnight at 25° C. Any undissolved dye was removed by filtration, yielding a saturated aqueous solution of the dye. 1 g of this saturated aqueous solution of the dye was dried in an oven at 100° C., the mass of the residual solid fraction was measured, and the degree of solubility of the water-soluble dye at 25° C. was determined. The results are listed in Table 2.

Dispersion Threshold Concentration of Self-Dispersible Pigment

A dispersion containing the self-dispersible pigment dispersed stably within water was subjected to dewatering at 25° C., thereby concentrating the self-dispersible pigment. Following excessive concentrating of the dispersion, the dispersion was filtered, the amount of pigment within the filtrate was measured, and the dispersion threshold concentration at 25° C. was determined. The results are listed in Table 2.

TABLE 2

Coloring material: degree of solubility at 25° C. or dispersion threshold concentration at 25° C. (% by mass)

| | Coloring material | Degree of solubility/ Dispersion threshold concentration |
|---|---|---|
| Degree of solubility of water-soluble dye | Water Red 27 | 9.2% |
| | Water Yellow 6 | 20.1% |
| | Water Blue 3 | 33.7% |
| Dispersion threshold concentration of self-dispersible pigment | CAB-O-JET 300 | 22.8% |

Further, from the above results of measuring the degree of solubility of the above water-soluble dyes and the dispersion threshold concentration of the self-dispersible pigment, the amount of water required to dissolve or disperse the coloring material was calculated using the formula below. The results are detailed in Table 3.

(Amount of water required to dissolve or disperse the coloring material)=(mass of coloring material)÷(degree of solubility of dye, or dispersion threshold concentration of self-dispersible pigment)−(mass of coloring material)

Amount of Water Within the Ink

The amount of water within the ink of each example and comparative example was measured using the Karl Fischer method. A Karl Fischer water content measuring apparatus (model 701, manufactured by Metrohm-Shibata Co., Ltd.) was used for the measurements. The results are listed in Table 3.

(Evaluations)

Next, the image density and the storage stability were evaluated for each of the examples and comparative examples. The evaluation results are detailed in Table 3.

Evaluation of Image Density

The ink of each example and comparative example (see Table 3) was loaded into an inkjet recording apparatus HC5000 (manufactured by Riso Kagaku Corporation), and a solid image was printed onto plain paper (Riso light paper, manufactured by Riso Kagaku Corporation), thus yielding a printed item. The HC5000 is a system that uses a 300 dpi line-type inkjet head (in which the nozzles are aligned with an approximately 85 μm spacing therebetween), wherein the paper is transported in a sub-scanning direction perpendicular to the main scanning direction (the direction along which the nozzles are aligned) while printing is conducted. The printed plain paper was left to stand overnight, and the OD value of the printed surface was then measured using an OD meter (RD920, manufactured by MacBeth Corporation) and evaluated against the following criteria.

A: 1.1 or greater
B: less than 1.1, but at least 1.0
C: less than 1.0, but at least 0.9
D: less than 0.9

Evaluation of Show-Through

The non-printed surface (the underside) of the printed items obtained in the above evaluation of image density were inspected visually, and items with no noticeable show-through were evaluated as A, whereas items with noticeable show-through were evaluated as D.

Evaluation of Storage Stability

The viscosity of the ink from each example and comparative example was measured using a viscometer (AR-G2, manufactured by TA Instruments, Japan Inc.), the ink was left to stand for one week at 25° C., and the viscosity was then re-measured. The ink storage stability was determined on the basis of the viscosity change represented by (viscosity after standing−viscosity before standing)/(viscosity before standing)×100, and was evaluated against the following criteria.

A: less than 5%
B: at least 5%, but less than 10%
C: at least 10%, but less than 20%
D: at least 20%

In the comparative example 1, a W/O emulsion was not formed, and therefore the various evaluations were unable to be performed.

TABLE 3

Final ink compositions and evaluation results

| Parts by mass | | Example 1 | Example 2 | Example 3 | Example 4 | Example 5 | Example 6 |
|---|---|---|---|---|---|---|---|
| Coloring material (solid fraction) | Water Red 27 | 4.9 | — | — | — | 5.0 | 5.1 |
| | Water Yellow 6 | — | 9.9 | — | — | — | — |
| | Water Blue 3 | — | — | 20.0 | — | — | — |
| | CAB-O-JET 300 | — | — | — | 10.0 | — | — |
| | Oil Yellow 129 | — | — | — | — | — | — |
| Water | Ion-exchanged water | 12.0 | 10.5 | 20.0 | 0.6 | 1.0 | 28.2 |
| Water-insoluble solvent | AF-7 | 39.1 | 37.3 | 25.0 | 39.7 | 44.5 | 30.8 |
| | IOP | 39.1 | 37.3 | 25.0 | 39.7 | 44.5 | 30.8 |
| Surfactant | Hexaglyn PR-15 | 4.9 | 5.0 | 10.0 | 10.0 | 5.0 | 5.1 |
| Total | | 100.0 | 100.0 | 100.0 | 100.0 | 100.0 | 100.0 |
| Amount of water required to dissolve or disperse coloring material | | 49.4 | 39.5 | 37.7 | 33.9 | 49.3 | 50.6 |
| Evaluations | Image density | A | B | B | A | B | B |
| | Show-through | A | A | A | A | A | A |
| | Storage stability | A | A | B | A | A | C |

| Parts by mass | | Example 7 | Comparative example 1 | Comparative example 2 | Comparative example 3 | Comparative example 4 |
|---|---|---|---|---|---|---|
| Coloring material (solid fraction) | Water Red 27 | 5.0 | 5.0 | 4.0 | 1.0 | — |
| | Water Yellow 6 | — | — | — | — | — |
| | Water Blue 3 | — | — | — | — | — |
| | CAB-O-JET 300 | — | — | — | — | — |
| | Oil Yellow 129 | — | — | — | — | 4.0 |
| Water | Ion-exchanged water | 0.0 | 49.3 | 40.0 | 10.0 | — |
| Water-insoluble solvent | AF-7 | 45.0 | 20.3 | 25.5 | 42.0 | — |
| | IOP | 45.0 | 20.3 | 25.5 | 42.0 | 96.0 |
| Surfactant | Hexaglyn PR-15 | 5.0 | 5.0 | 5.0 | 5.0 | — |
| Total | | 100.0 | 100.0 | 100.0 | 100.0 | 100.0 |
| Amount of water required to dissolve or disperse coloring material | | 49.3 | 49.3 | 39.5 | 9.9 | — |
| Evaluations | Image density | B | — | B | D | D |
| | Show-through | A | — | A | A | D |
| | Storage stability | A | — | D | A | A |

As is evident from Table 3, in examples 1 to 7, the dewatering of the W/O emulsion inks reduced the amount of water to an amount of water less than that required to dissolve or disperse the dye or pigment, and the storage stability and image density were excellent for these inks.

In comparison, in comparative examples 1 to 3, each of the inks contained the amount of water required to dissolve or disperse the dye or pigment. In comparative example 1, the amount of water within the ink was large, and a W/O emulsion could not be stably formed. Comparative example 2 also contained a large amount of water, and although a W/O emulsion was able to be formed, the storage stability of the emulsion was poor. In comparative example 3, the amount of water within the ink was small, but the amount of the dye was also small, and therefore the image density was low and unsatisfactory. Comparative example 4 used an oil-soluble dye, and not only was the image density low, but the level of show-through was noticeable and unsatisfactory.

It is to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A non-aqueous inkjet ink comprising a coloring material and a water-insoluble solvent, wherein
   the coloring material is water-soluble,
   an amount of water within the ink is less than an amount of water required to dissolve the coloring material, and
   an amount of water within the ink, relative to a total mass of the ink, is not less than 10.5% by mass and not more than 28.2% by mass.

2. The non-aqueous inkjet ink according to claim 1, wherein the coloring material comprises a water-soluble dye.

3. The non-aqueous inkjet ink according to claim 1, wherein an amount of water within the ink, relative to an amount of water required to dissolve the coloring material, is not more than 60% by mass.

4. The non-aqueous inkjet ink according to claim 2, wherein a degree of solubility of the water-soluble dye is not less than 9.2% and not more than 33.7% by mass.

5. A non-aqueous inkjet ink comprising a coloring material and a water insoluble solvent, wherein
   the coloring material is water-soluble;
   an amount of water in the ink is less than an amount of water required to dissolve the coloring material, wherein the amount of water in the ink, relative to the total mass of the ink, is not less than 10.5% by mass and not more than 28.2% by mass; and the ink is prepared by a method including dissolving the coloring material in water and adding the water insoluble solvent to form a mixture, and removing all or part of the water from the mixture.

* * * * *